United States Patent
Camenisch et al.

(10) Patent No.: US 10,790,980 B2
(45) Date of Patent: Sep. 29, 2020

(54) ESTABLISHING TRUST IN AN ATTRIBUTE AUTHENTICATION SYSTEM

(71) Applicant: International Business Machines Corporation, Armonk, NY (US)

(72) Inventors: Jan Leonhard Camenisch, Thalwil (CH); Luca Alessandro Comparini, Suresnes (FR); Maria Dubovitskaya, Zurich (CH); Gregory Neven, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 15/649,992

(22) Filed: Jul. 14, 2017

(65) Prior Publication Data
US 2019/0020480 A1 Jan. 17, 2019

(51) Int. Cl.
H04L 9/32 (2006.01)
H04L 9/08 (2006.01)
H04L 29/06 (2006.01)

(52) U.S. Cl.
CPC ............ H04L 9/3221 (2013.01); H04L 9/08 (2013.01); H04L 9/3239 (2013.01); H04L 9/3263 (2013.01); H04L 63/0823 (2013.01); H04L 9/32 (2013.01); H04L 9/3242 (2013.01); H04L 2209/38 (2013.01)

(58) Field of Classification Search
CPC ....... H04L 9/08; H04L 9/3221; H04L 9/3263; H04L 63/0823
See application file for complete search history.

(56) References Cited

U.S. PATENT DOCUMENTS

2010/0275009 A1 10/2010 Canard et al.
2012/0265997 A1* 10/2012 Laurie ................... G06F 21/31
713/185

(Continued)

FOREIGN PATENT DOCUMENTS

WO 2016128569 A1 8/2016

OTHER PUBLICATIONS

Hardjono et al. "Anonymous Identities for Permissioned Blockchains", MIT Technical Report, Jan. 2016 (Year: 2016).*

(Continued)

Primary Examiner — Noura Zoubair
(74) Attorney, Agent, or Firm — Tracey Robertson; Otterstedt, Wallace & Kammer, LLP

(57) ABSTRACT

Computer-implemented methods for privacy attribute based credentials include issuing a privacy-preserving attribute-based credential, which is signed with a private key and has a unique credential handle; updating an accumulator in a tamperproof log to incorporate the credential handle; and facilitating providing access to a service in response to a zero-knowledge proof that the accumulator contains the credential handle. The methods also include generating revocation conditions and initial revocation information; submitting the initial revocation information and the revocation conditions to the tamperproof log; revoking a credential by adding a credential handle of the credential to the initial revocation information; and submitting the updated revocation information to the tamperproof log. Further, the methods include writing to the tamperproof log an audit token that contains an encrypted credential handle, which is encrypted by an auditor's public key that is published on the tamperproof log.

6 Claims, 10 Drawing Sheets

(56) References Cited

U.S. PATENT DOCUMENTS

| | | | |
|---|---|---|---|
| 2013/0138570 A1 | 5/2013 | Ross | |
| 2013/0305043 A1* | 11/2013 | Zhang | H04L 9/3268 713/158 |
| 2014/0229384 A1* | 8/2014 | St. Johns | H04L 9/3268 705/50 |
| 2015/0341340 A1 | 11/2015 | Lu et al. | |
| 2016/0254910 A1* | 9/2016 | Finlow-Bates | H04L 9/0891 713/158 |
| 2016/0283941 A1 | 9/2016 | Andrade | |
| 2017/0338967 A1* | 11/2017 | Lewison | H04L 9/3268 |

OTHER PUBLICATIONS

Garman et al. "Decentralized Anonymous Credentials", NDSS 2014, Feb. 2014 (Year: 2014).*

NIST, "The NIST Definition of Cloud Computing". Special Publication 800-145. Sep. 2011, pp. 1-7.

Kris Shrishak et al. "Enhancing the Privacy of Users in eID schemes", Proc. 37th WIC Symposium on Information Theory in the Benelux. May 2016, p. 158-165. Leuven, Belgium.

Jan Camenisch et al., "Specification of the Identity Mixer Cryptographic Library", IBM Research—Zurich. Apr. 2010, p. 1-48.

Wouter Lueks et al., "Fast Revocation of Attribute-Based Credentials for Both Users and Verifiers." Proc. 30th IFIP International Information Security Conference (SEC). May 2015. pp. 463-478.

Hyperledger, "The Fabric Model", http://hyperledger-fabric.readthedocs.io/en/latest/fabric_model.html. Mar. 2017. pp. 1-3.

Schanzenbach, M., & Banse, C. (Sep. 2016). Managing and Presenting User Attributes over a Decentralized Secure Name System. In International Workshop on Data Privacy Management (pp. 213-220). Springer International Publishing.

* cited by examiner

ESTABLISHING TRUST IN AN ATTRIBUTE AUTHENTICATION SYSTEM

BACKGROUND

The present invention relates to the electrical, electronic and computer arts, and more specifically, to identity and attribute authentication systems.

In digital commerce, users interact with a variety of service providers ("SPs") to obtain goods and services. An SP typically verifies certain user attributes in order for the user to obtain a good or service. Typical attributes that need to be verified include age and ability to pay for the good or service. For example, a movie streaming SP may request a user to provide proof of age greater than twelve years and proof of ability to pay for streamed content. The user then transmits to the SP some identifying information (e.g., the user's exact age, and the user's subscription login or payment card information).

SUMMARY

Principles of the invention provide techniques for establishing trust in an attribute authentication system by using a tamperproof log (e.g., blockchain technology) to implement the authentication system. In one aspect, an exemplary computer-implemented method includes facilitating issuing a privacy-preserving attribute-based credential, which is signed with a private key and has a credential handle as a unique attribute; facilitating updating an accumulator in a tamperproof log to incorporate the credential handle; and facilitating providing access to a service in response to a zero-knowledge proof that the accumulator contains the credential handle.

According to other embodiments of the invention, an exemplary computer-implemented method includes facilitating generating revocation conditions and initial revocation information; facilitating submitting the initial revocation information and the revocation conditions to a tamperproof log; facilitating revoking a credential by adding a credential handle of the credential to the initial revocation information; and facilitating submitting the updated revocation information to the tamperproof log.

According to other embodiments of the invention, an exemplary computer-implemented method includes facilitating writing to a tamperproof log an audit token that contains an encrypted credential handle, wherein the credential handle is encrypted by an auditor's public key that is published on the tamperproof log.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

In view of the foregoing, it will be appreciated that techniques of the present invention can provide substantial beneficial technical effects. For example, one or more embodiments provide one or more of:

Fully private authentication of user attributes in an attribute authentication system.

Trusted distribution of public keys for participants in an attribute authentication system.

Trusted and private revocation of user credentials in an attribute authentication system.

Trusted auditing of user credentials in an attribute authentication system.

Privacy-preserving certificate transparency system.

These and other features and advantages of the present invention will become apparent from the following detailed description of illustrative embodiments thereof, which is to be read in connection with the accompanying drawings.

DETAILED DESCRIPTION

Figure 1:
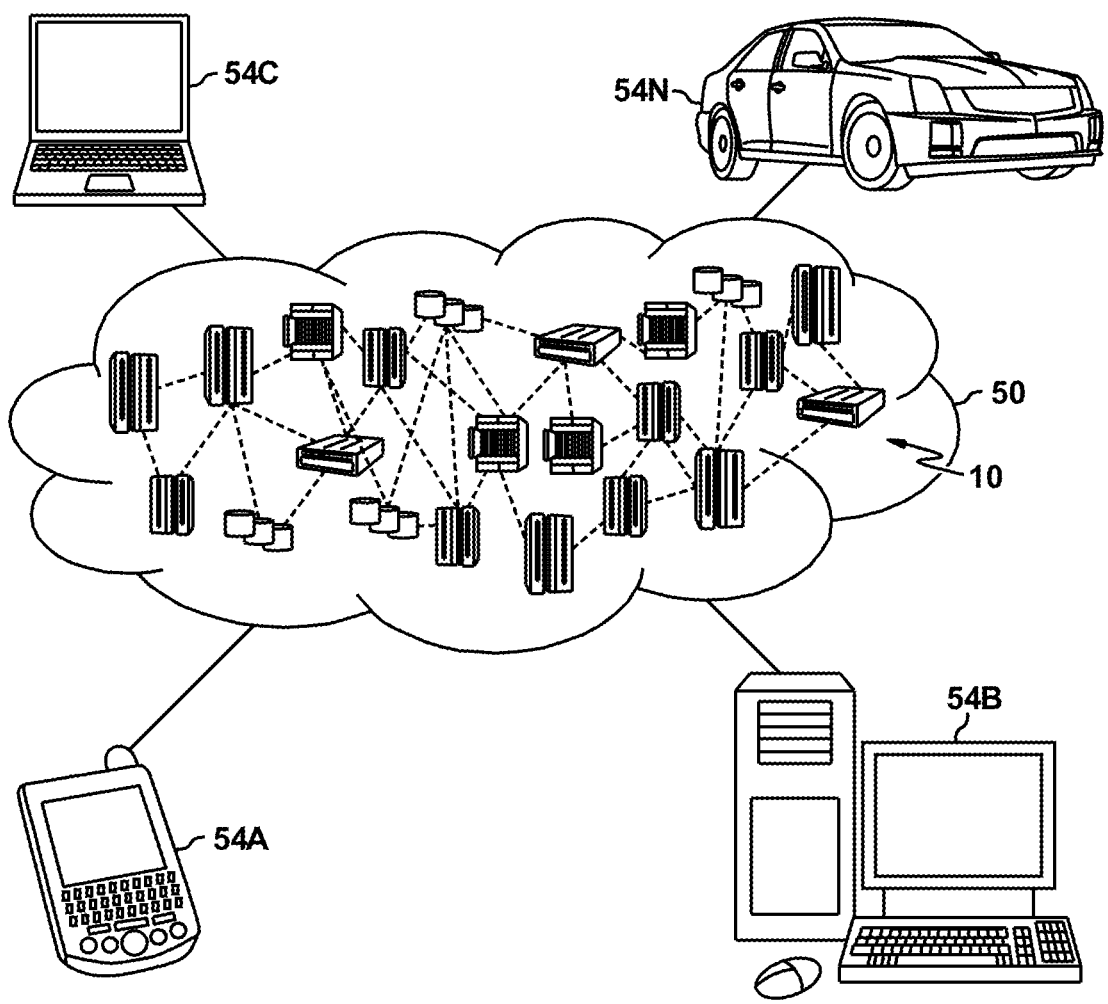
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
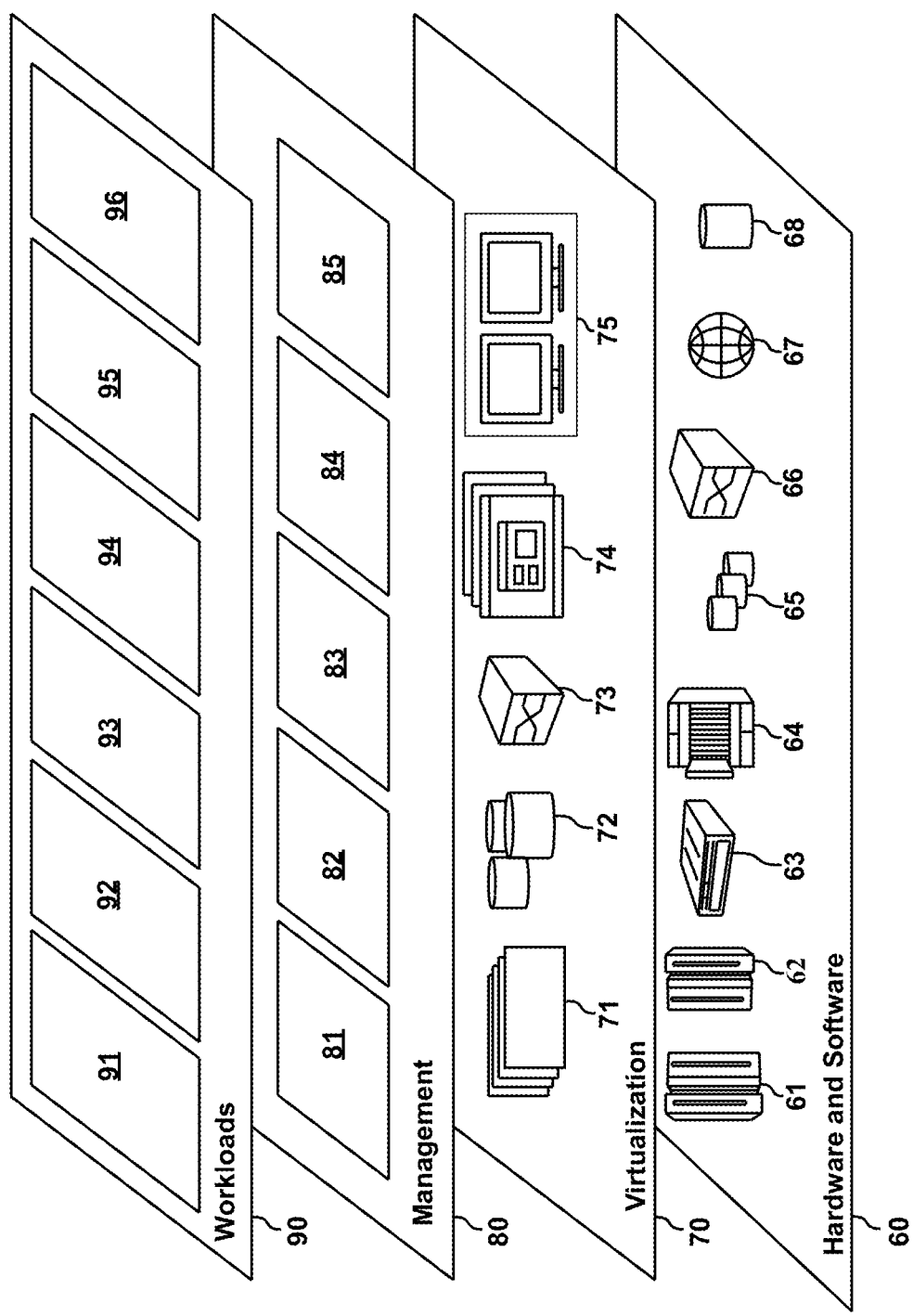
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a distributed attribute authentication system 96.

Conventional modes of attribute verification expose at least certain aspects of the user's identity ("linkable data") to an SP. The linkable data can be obtained and mis-used by third parties to execute transactions under the user's identity, or to track the user's transactions.

Privacy Attribute-based credentials ("PABCs") can be used to preserve a user's privacy. In an attribute authentication scheme, an identity provider ("issuer") authenticates the user's attributes as credentials by signing the attributes with the issuer's private key under a public-key infrastructure (PKI) scheme. The issuer publishes its public key to a blockchain that is accessible by the user and by SPs. The user then can utilize the authenticated credentials to verify its own attributes to the SP in response to one or more requests from the SP. For example, the movie streaming SP requests the user to verify an age greater than twelve years and ability to pay for streamed content. The user then manipulates its authenticated credentials in response to the verification request(s) in order to generate an access token that discloses only the minimal information necessary to meet the SP's requests (e.g., predicates for age greater than twelve and ability to pay). The access token includes a digital signature from the issuer, which the SP trusts. The user then transmits the access token to the SP, which accepts the digitally signed access token to verify that the user's attributes meet the requests. Because each access token is generated in a one-time fashion responsive to the SP's requests, even if an access token is obtained by third parties it is not susceptible to mis-use. Thus, a PABC scheme can thwart identity theft. Furthermore, PABC authentication preserves a user's privacy by not exposing linkable data such as a birthdate or payment card number.

The participants in an attribute-based authentication system include the issuers, users and service providers ("SPs"). An issuer assigns and certifies a list of attribute values to the user by issuing a credential. Users can then use these credentials to authenticate to SPs. To authenticate a user the SP sends a presentation policy to the user specifying what attributes or predicates over attributes and from which credentials need to be disclosed by the user. The presentation policy also specifies the issuer(s) that the SP trusts to correctly attest user's attributes. The SP uses that issuer's public key to verify the user's proof (so called presentation token) with respect to the policy. Users' credentials as well as issuers' public keys can be revoked by distributing the revocation information to all entities in the system. Furthermore, some of the attributes can be conditionally disclosed only to special entities (called auditors). In that case, the policy would specify the public key of the auditor under which the attribute is encrypted and the conditions under which the attribute can be decrypted by the auditor. When a user is not entitled to certain attributes, the user's credentials should be revoked. This is done by a special entity called a revocation authority ("RA") (an issuer, an SP, or an auditor can also act as an RA) by distributing the updated revocation information that can be used by the SPs to make sure that the credential was not revoked. While all those mechanisms are successfully realized by existing standard (X.509) or privacy-preserving (Identity Mixer, UProve) credential systems, bootstrapping such a system and establishing the trust between different entities by distributing public keys, presentation policies, and enforcing revocation and auditing conditions remains to be an open problem and often left out as an out-of-bound setup assumption. If an SP uses a malicious key for verification, presentation policies are maliciously formed, or auditing policies are not enforced the security of the system is broken. Revocation of users and auditability of their transactions on different scale (global and verifier-driven revocation of credentials, auditing all transaction of a user vs. a certain type of transaction done by a user) are also challenging tasks. A particular challenge in privacy-preserving credential systems is that issuers and verifiers can try to segregate users by issuing credentials to different users under different public keys, by temporarily revoking credentials of targeted users, or by manipulating presentation policies to "narrow down" on particular user attributes (e.g., by repetitively narrowing the interval of valid birth dates).

PKI and trusted frameworks are used to distribute issuers' public keys and establish the trust between issuers and SPs. However, they require an existance of a single point of trust (root certificate authority (CA) or a trusted party). Certificate transparency systems allow one to distribute the trust, but only cover the CA's public keys and do not support privacy-preserving credentials that provide unlinkability. Furthermore, they do not consider revocation information or presentation policies distribution and their enforcement. Additionally, the above mechanisms do not prevent issuers from having multiple public keys or frequently changing their public keys to segregate their users. Frequent changes of revocation information and revocation policies are obviously also not prevented, since these are not covered at all in the log.

Recent innovation has focused on how to revoke a PABC if, for example, a third party obtains a copy of an authenticated credential rather than just an access token. A procedure for fast revocation of PABCs has been proposed. This procedure encodes a revocation value with a credential in such a manner that the credential can be identified when it is revoked.

Accordingly, a "tamperproof" log is used to establish the trust in distributed systems and enforce contract executions between multiple parties in the system. Throughout this disclosure, "tamperproof" denotes data recorded in such a way that it is computationally impracticable to alter the data without leaving evidence of its alteration. Distributed consensus proof-of-work concepts, such as blockchain, are one type of tamperproof log given that, in order to alter any record without trace of alteration, an attacker would need to take over a supermajority of the participants in the blockchain and additionally would need to recalculate each and every record subsequent to the altered record at each overtaken participant.

In one or more embodiments, the tamperproof log is maintained by a single trusted authority. In other embodiments, the log is maintained in a distributed manner, e.g., through a blockchain. One advantage of using a distributed log such as a blockchain is that there is no single authority who can improperly manipulate the log. A distributed log also ensures non-repudiation of all transactions that were executed between the parties and added to the log. Therefore, one or more embodiments use tamperproof distributed logs for distributing public keys, revocation and auditing grounds, policies of the issuers, auditors, and RA, and presentation policies of the SPs. Also, smart contracts can be added to the log and executed to enforce revocation and audit. These smart contracts can check conditions on the number and change frequency of public keys, revocation information, and presentation policies of registered issuers and verifiers. Before engaging in an issuance protocol with an issuer or a presentation protocol with a verifier, a user checks the log to ensure that the user is interacting with a legitimate party and that the parameters (public keys, revocation information, and presentation policies) are included in the log and satisfy the security criteria. One or more exemplary embodiments also provide a privacy-preserving certificate transparency solution using accumulators and a tamperproof log.

Figure 3:
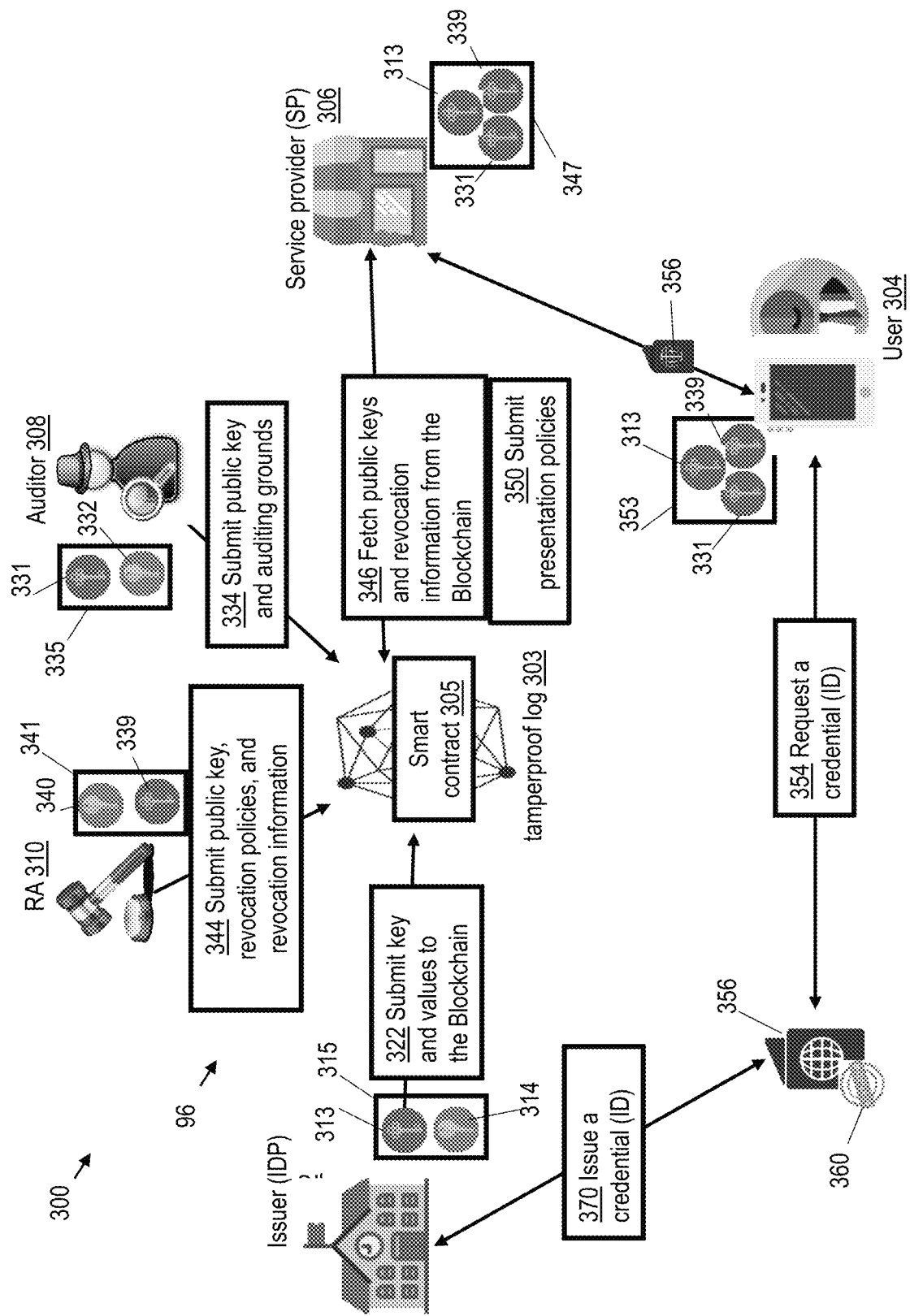
FIGS. 3-7 depict a method for establishing trust in an attribute authentication system, according to an exemplary embodiment of the invention.

FIG. 3 is a combined flowchart and block diagram that depicts one or more embodiments of the invention, according to which an issuer 302, a user 304, an SP 306, an auditor 308, and an RA 310 perform certain aspects of a method 300 for establishing trust in the distributed attribute authentication system 96. As a central concept of the system 96, these participants work together to maintain a tamperproof log 303 (e.g., a permissioned or permissionless blockchain; or another cryptographically proven log, for example, one similar to Google's Certificate Transparency architecture) that records all participants and transactions in the system, and that can be configured to implement smart contracts 305. The roles of the participants in the method 300 are further discussed below.

Figure 4:
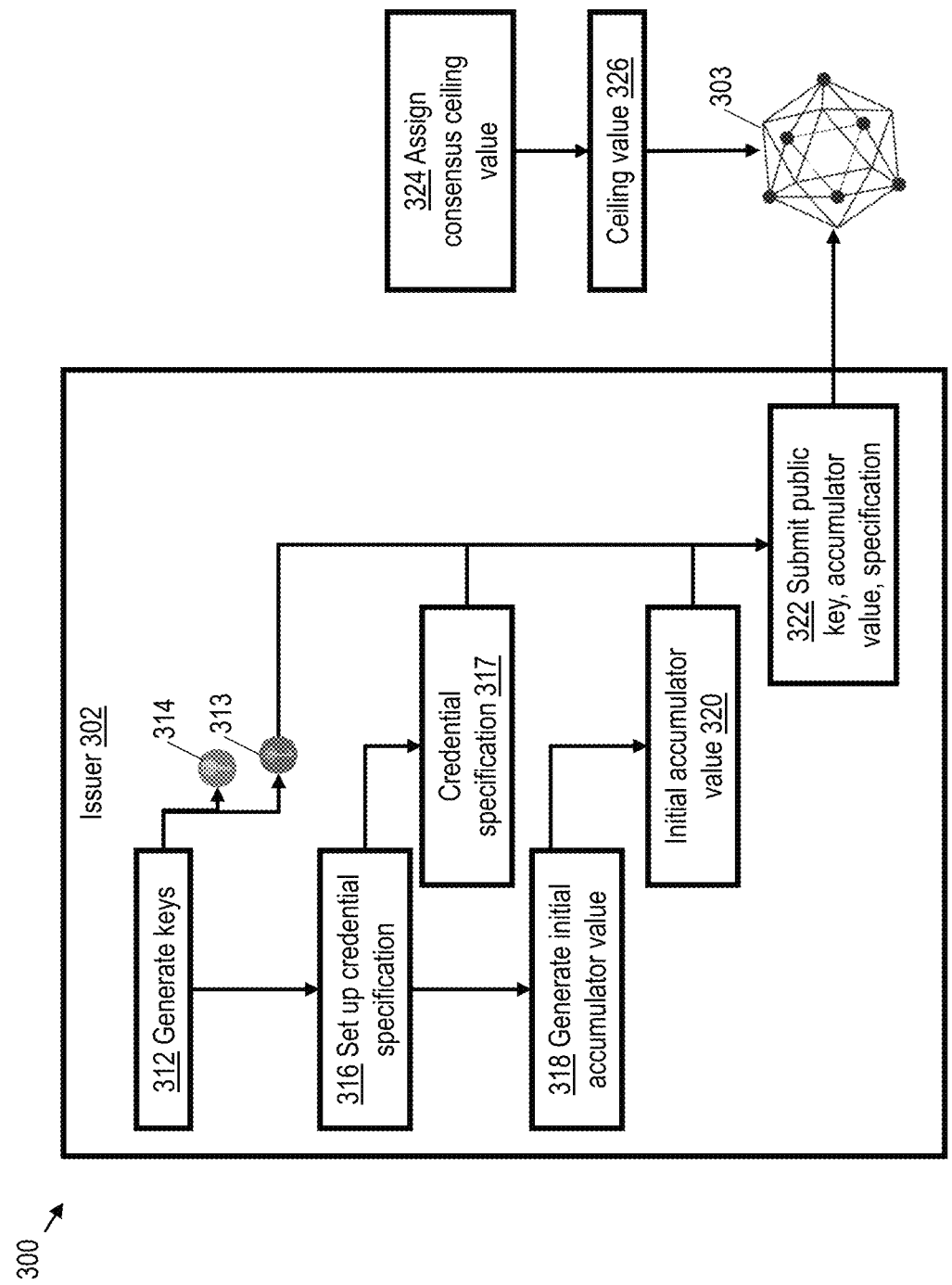

Issuers 302 (see also FIG. 4). In response to an issuer 302 joining the system 96, at step 312 the issuer generates public and private signing keys 313, 314, and stores the keys in an issuer's key locker 315. At step 316 the issuer 302 sets up a credential specification 317 that defines what attributes are certified in a credential issued by the issuer 302. The issuer 302 also performs step 318 of generating an initial accumulator value 320 for certificate transparency. The issuer 302 then performs step 322 of submitting its public key 313, the initial accumulator value 320, and the corresponding credential specification 317 to the tamperproof log 303 (e.g., as a blockchain "write" transaction). To support certificate transparency, each of the other participants performs step 324 of assigning to the issuer 302 a consensus ceiling value 326 that specifies a maximum amount of credentials that can be legitimately issued by the issuer in a certain time period. At any time in response to the consensus ceiling value 326 being exceeded by the value of the issuer's accumulator 328 in the tamperproof log 303, then the issuer 302 is considered to have a malicious behavior and any credentials issued by the issuer are considered to be improperly issued.

Figure 5:
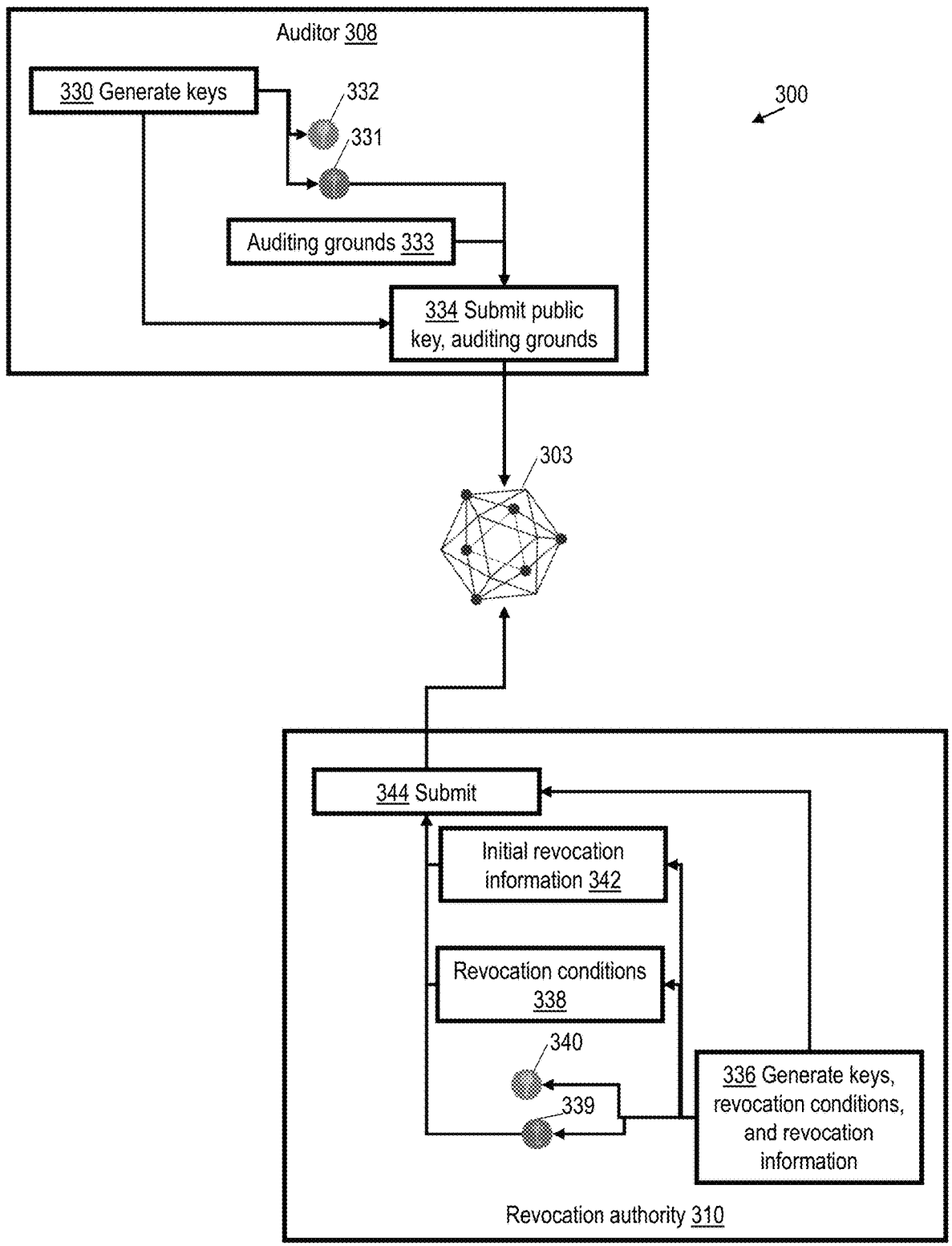

Auditors 308 (see also FIG. 5). In response to an auditor 308 joining the system 96, it performs step 330 of generating its public and private encryption keys 331, 332 and its auditing grounds 333. The auditor 308 stores the keys 331, 332 in an auditor's key locker 335. The auditor 308 then proceeds to step 334 of submitting the public key 331 and the auditing grounds 333 to the tamperproof log 303. To distribute trust among multiple auditors, the encryption keys 331, 332 can be shared between N auditors, so that only if M out of N auditors are present, decryption can succeed as further discussed below.

RAs 310 (see also FIG. 5). In response to an RA 310 joining the system 96, it performs step 336 of generating its revocation conditions 338, public and private signing keys 339, 340, and initial revocation information 342. The RA 310 stores its keys 339, 340 in an RA key locker 341. At step 344 the RA 310 then submits its public key 339 and the revocation information 342 to the tamperproof log 303.

Figure 6:
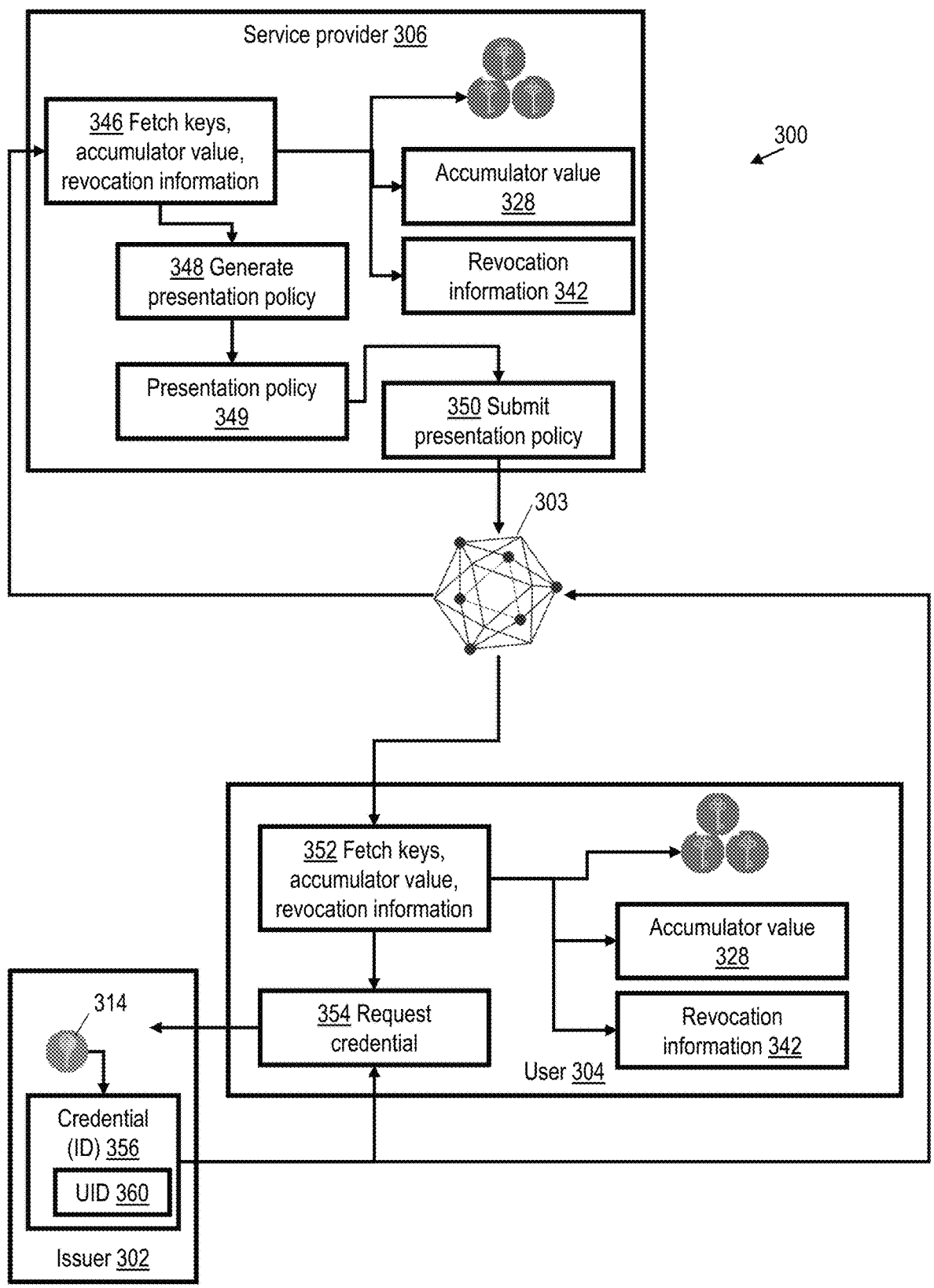

SPs 306 (see also FIG. 6). In response to an SP 306 joining the system 96, at step 346 it fetches from the tamperproof log 303 the issuer, auditor, and RA public keys 313, 331, 339, corresponding issuer accumulator 328, and the revocation information 342. The SP 306 stores the keys 313, 331, 339 in an SP key locker 347. At step 348 the SP 306 then generates its presentation policies 349 based on that data and at step 350 the SP 306 submits the presentation policies 349 to the tamperproof log 303.

Users 304 (see also FIG. 6). In response to a user 304 joining the system 96, at step 352 he/she fetches the issuer, auditor, and RA public keys 313, 331, 339, corresponding issuer accumulator 328, and the revocation information 342 from the tamperproof log 303. The user 304 stores the keys 313, 331, 339 in a user key locker 353. At step 354 the user 304 then requests the issuer 302 to issue one or more identity certificates or credentials 356, each of which incorporates one or more user attributes 358. Each credential 356 is certified by being signed with the issuer's private key 314. In one or more exemplary embodiments, the signature on the credential 356 incorporates a digital signature of the credential's contents with the issuer's private key, so that the user 304 cannot modify the credential 356, or any of the attributes contained in the credential, without invalidating the signature. In one or more embodiments the digital signature is a non-standard signature, in that no hashing is done before signing; only separate attribute values are hashed.

In order to prevent the issuers 302 from improperly issuing credentials, and in order to control the amount of credentials 356 that are issued by each issuer 302, one or more embodiments provide certificate transparency mechanisms. Advantageously, these certificate transparency mechanisms provide both privacy and the ability to distribute and maintain an issuance log in a decentralized and at the same time trustworthy way.

Figure 7:
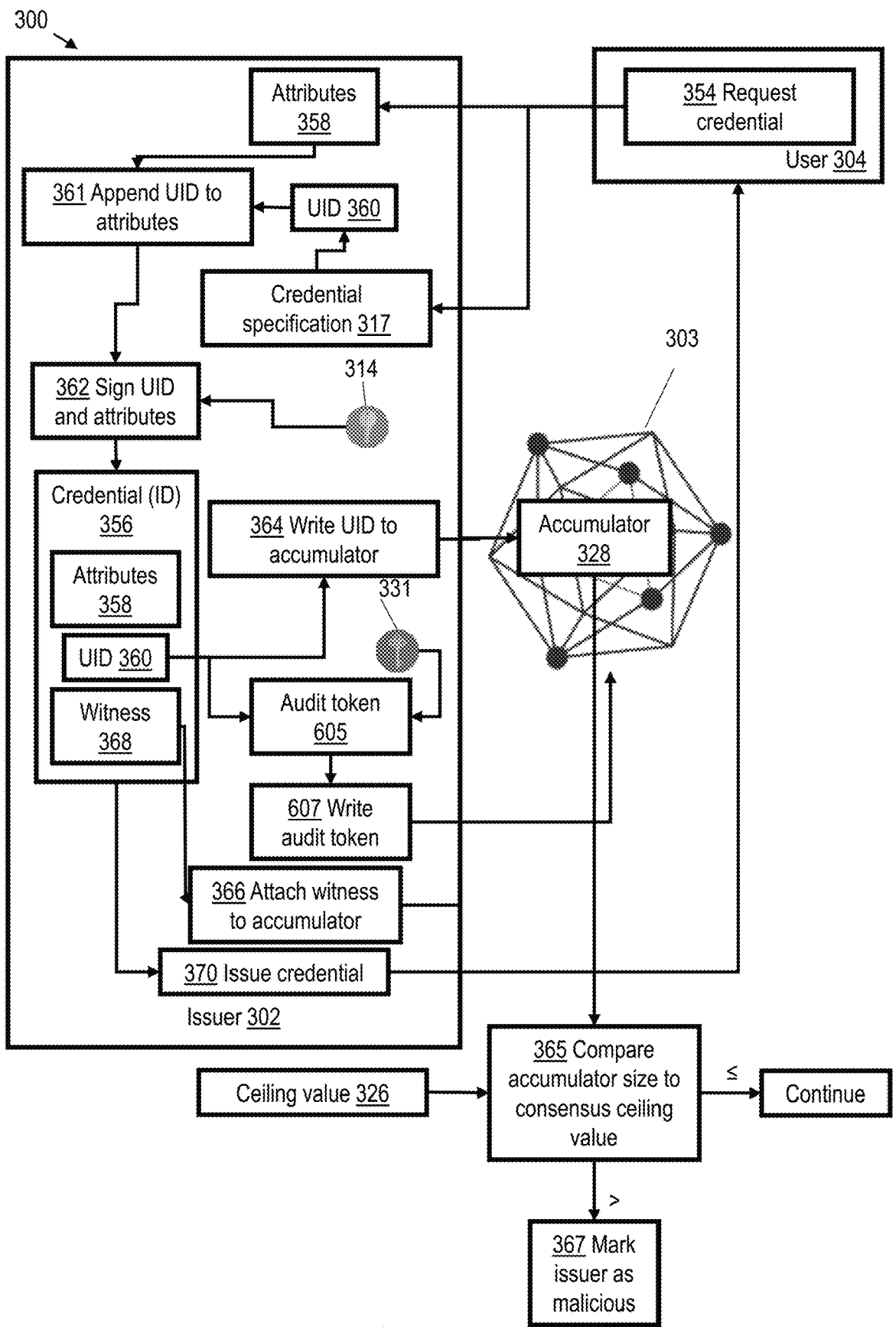

FIG. 7 depicts certain aspects of exemplary certificate transparency mechanisms. According to one or more embodiments, certificate transparency is implemented by an issuer 302 causing each credential 356 to contain an attribute (a serial number, etc.) that is a unique identifier or credential handle, hereafter called a UID 360, which can be used to revoke, audit and verify if the credential can be considered improperly issued. A credential 356 can contain multiple UIDs 360, each used for a different purpose or in a different context. The credential specification 317 defines the UIDs 360 and the context for using each UID.

At step 361 in FIG. 7, the issuer 302 appends the UID 360 to a user's attributes 358. At step 362, the issuer 302 digitally signs the user's attributes 358 and the UID 360 with its private key 314 to generate a new credential 356. At step 364, the issuer 302 writes the UID 360 of the new credential 356 to the issuer's accumulator 328 in the tamperproof log 303. Thus, the accumulator 328 incorporates the UIDs 360 of all credentials 356 that the issuer 302 has issued. At step 365, any participant in the tamperproof log 303 (including the issuer 302) compares the size of the accumulator 328 to the consensus ceiling value 326. In case the size of the accumulator 328 (number of UIDs incorporated into the accumulator) exceeds the consensus ceiling value 326, then any participant reading the accumulator 328 will facilitate step 367 of marking the issuer 302 as malicious until and unless the consensus ceiling value is increased. In case the size of the accumulator 328 is less than or equal the consensus ceiling value 326, then the method will continue. At step 366 the issuer 302 also attaches to the updated accumulator 328 a witness 368 that the user 304 can use to prove in a privacy-preserving manner that the accumulator 328 includes the UID 360 from the user's credential 356. In one or more embodiments, the issuer 302 also attaches the witness 368 to the credential 356. In one or more embodiments, a user downloads the corresponding witness 368 together with the revocation information 342. The witness 368 is a complimentary value to the UID 360 and the accumulator 328: f(UID, witness)=acc is used to prove that the UID 360 is in the accumulator 328 (or not). At step 370 the issuer 302 issues the credential 356 to the user 304.

Figure 8:
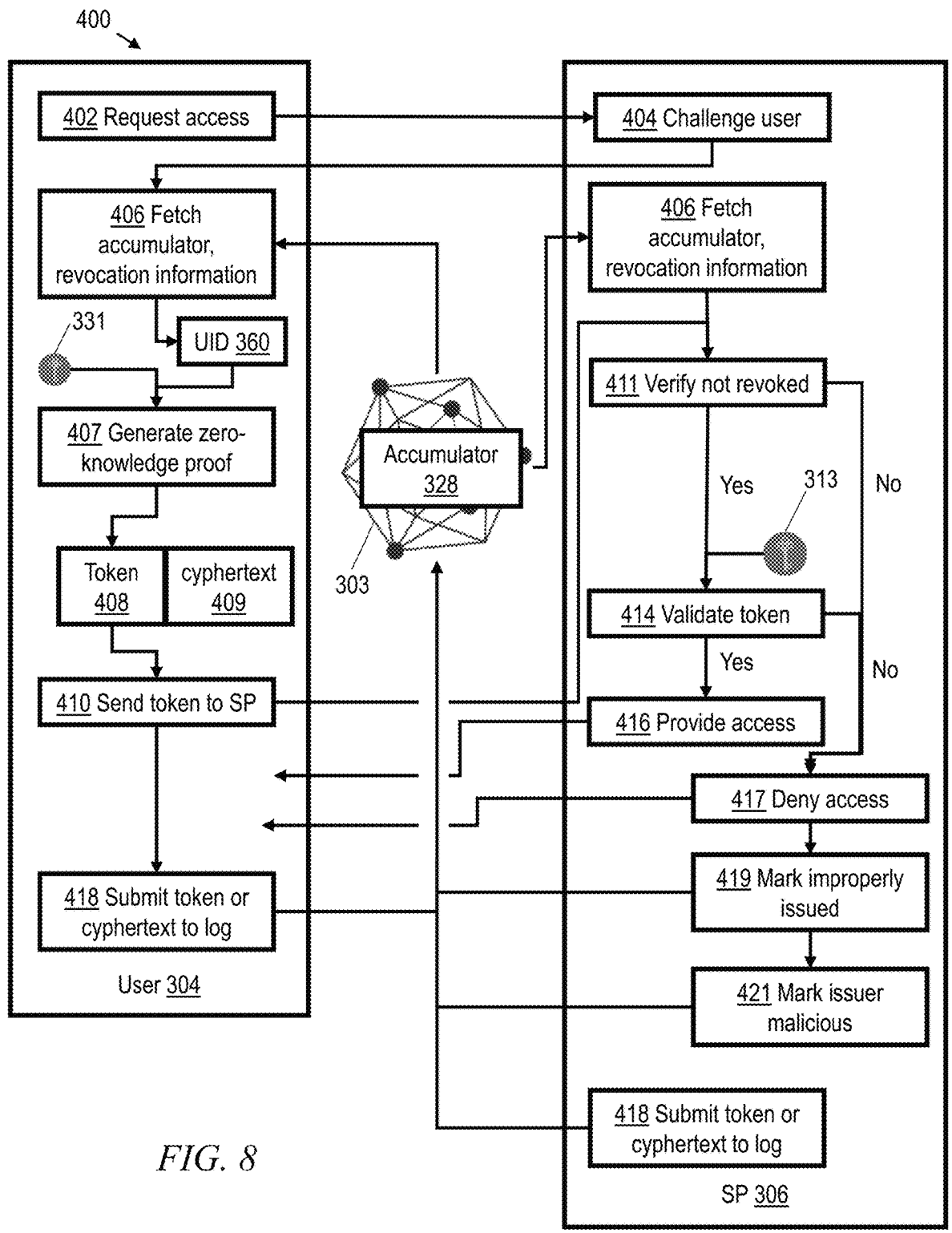
FIG. 8 depicts a method for requesting access to a service, according to an exemplary embodiment of the invention.

Referring to FIG. 8, at some time after joining the system 300 a user 304 might want to access a service offered by an SP 306, according to a method 400. At step 402, the user requests access to the service. At step 404, the SP 306 challenges the user 304 for a zero-knowledge proof that one of the user's attributes meets a standard required by the SP 306 for access to the service. At step 406, the user 304 fetches from the tamperproof log 303 the most recent accumulator 328 that corresponds to the issuer 302 that issued a relevant credential 356. At step 406 the user 304 also fetches the revocation information 342. In one or more embodiments, the SP 306 also performs step 406, fetching all the recent information from the log 303 to be on the same page with the user and other parties in the system. At step 407 the user 304 generates an unlinkable presentation token 408, which is a zero-knowledge proof that the UID(s) 360 from the credential 356 is contained in the accumulator 328, i.e. was legitimately issued, and that the credential 356 was not revoked, i.e. the UID 360 is not contained in the published revocation information 342. In one or more embodiments, the user 304 generates the token 408 by encrypting the UID 360 under the auditor's public key 331 and proving to the SP 306 in zero-knowledge that the encrypted UID 360 is signed inside the credential 356. In one or more embodiments, the user 304 also proves to the SP 306 in zero-knowledge that the UID 360 has not been revoked.

Thus, at step 410 the user 304 sends to the SP 306 the token 408, which is a cryptographic proof certifying that the user fulfills all conditions, without showing the user's attributes. Having the issuer's public key 313, revocation information 342, issuance accumulator value 328, and the auditor's public key 331, at step 411 the service provider 306 verifies the presentation token 408. This may include the validation that the UID 360, from which the token 408 was obtained, has not been revoked. Then at step 414 the service provider 306 validates the token 408, which demonstrates that the user 304 fulfills the conditions. At step 416, the SP 306 provides access. On the other hand, in case the UID 360 is on the revocation list, or in case the token 408 cannot be validated, then the service provider 306 proceeds to a step 417 of denying access, a step 419 of marking the UID 360 as improperly issued, and a step 421 of marking the UID issuer 302 as malicious.

At step 418 the user 304 or the SP 306 submits the token 408, or a hash of the token, or only associated cyphertext 409, to the tamperproof log 303. Correctness, authenticity, and integrity of the token 408 that is associated with the cyphertext 409 can be ensured by the token verification and signature of the party submitting the token.

Certificate transparency also supports revocation and auditing processes.

Figure 9:
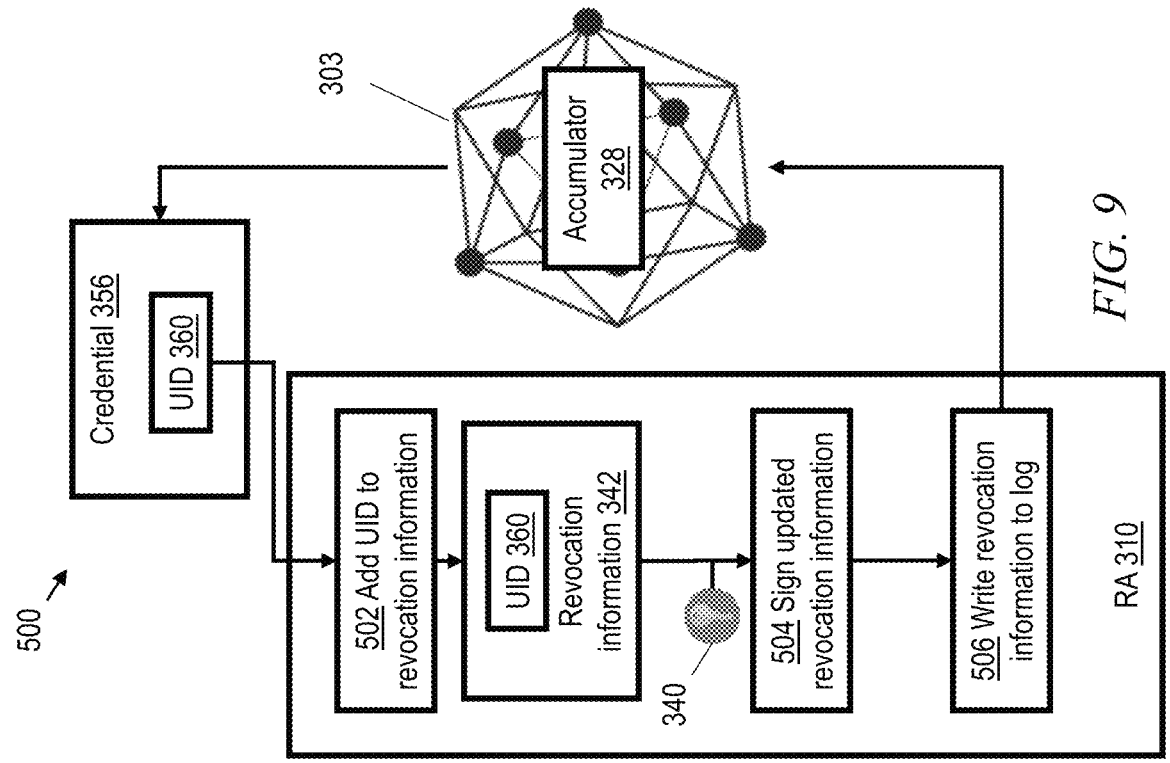
FIG. 9 depicts a method for revoking a credential, according to an exemplary embodiment of the invention.

FIG. 9 depicts a method 500, which the RA 310 can perform for revoking an credential 356. In response to an indication that the credential 356 needs to be revoked, at step 502 the RA 310 adds the corresponding UID 360 to the revocation information 342. At step 504 the RA 310 signs the updated revocation information with its private key 340. At step 506 the RA 310 submits the signed revocation information 342 to the tamperproof log 303.

Figure 10:
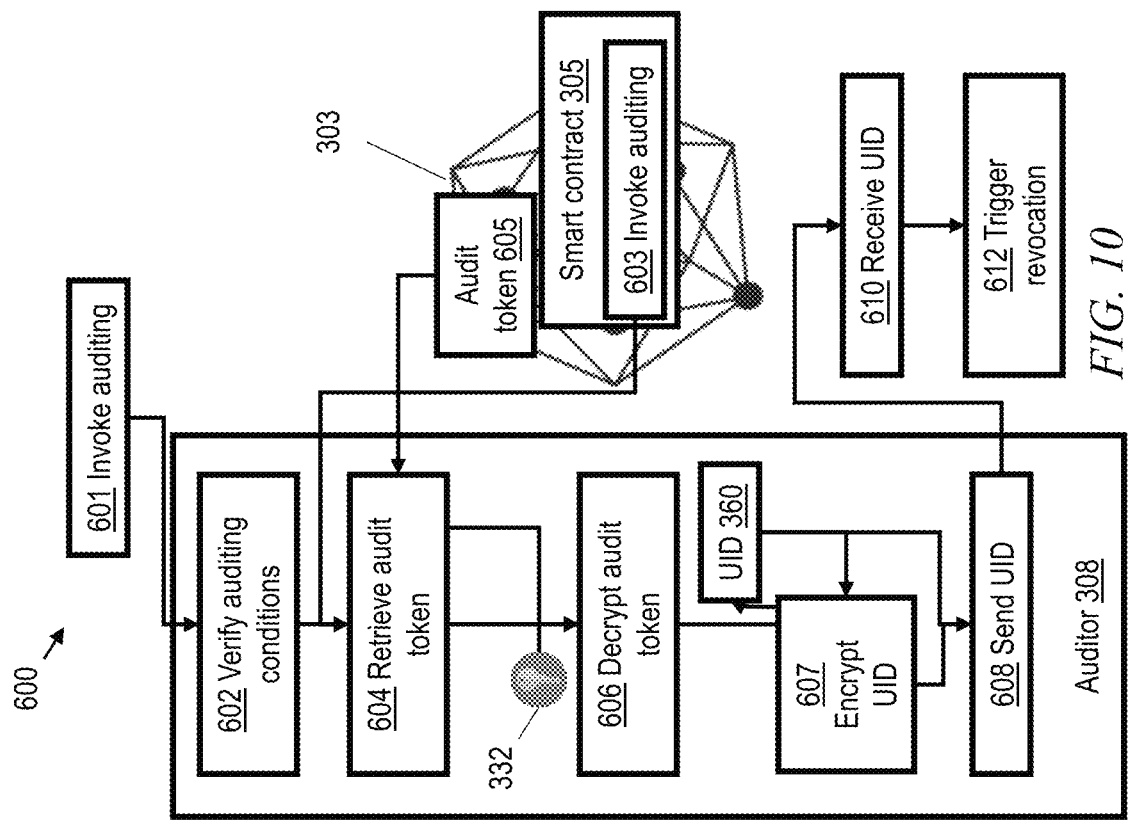
FIG. 10 depicts a method for auditing a credential, according to an exemplary embodiment of the invention.

FIG. 10 depicts a method 600, which the auditor 308 can perform for auditing the identity associated with an credential 356. Auditing conditions, under which anonymity is revoked and a UID 360 is decrypted, can be specified in an SP's presentation policy or can be encoded in a smart contract 305 (in case of blockchain) so that the auditing can be invoked automatically once the auditing conditions are fulfilled. Thus, there are two different entrances to the method 600. In one or more embodiments the method 600 begins at step 601, when a requesting party invokes the auditing method 600. At step 602 the auditor verifies that auditing conditions are fulfilled. In one or more other embodiments, at step 603 the smart contract 305 invokes the auditing method 600 in response to auditing conditions being fulfilled.

Once the auditing method 600 has been entered, at step 604 the auditor 308 (or several auditors) retrieve an audit token 605, which is cyphertext of a UID (either from the tamperproof log 303 or by receiving it from the SP 306). The auditor 308 then uses the auditor's private key 332 for step 606 of decrypting the audit token 605, and performs step 608 of sending the decrypted UID 360 back to the party (or smart contract 305) that requested the audit. Optionally, the auditor 308 at step 607 re-encrypts the UID 360 with the requesting party's public key. The requesting party receives the recovered UID 360 at step 610. At step 612 the requesting party (or smart contract 305) triggers the revocation process 500 by which the RA 310 will add the recovered UID to the revocation information 342 and will submit the updated revocation information to the tamperproof log 303.

Given the discussion thus far, and with reference to the drawing Figures, it will be appreciated that, in general terms, an exemplary computer-implemented method 300, according to an aspect of the invention, includes facilitating step 370 of issuing a privacy-preserving attribute-based credential 356, which is signed with a private key 314 and has a credential handle 360 as a unique attribute; facilitating step 322 of updating an accumulator 328 in a tamperproof log 303 to incorporate the credential handle 360; and facilitating step 416 of providing access to a service in response to a zero-knowledge proof 408 that the accumulator 328 contains the credential handle 360. In one or more embodiments the exemplary method also includes facilitating step 365 of comparing a size of the accumulator 328 to a consensus ceiling value 326; and in response to the size of the accumulator 328 exceeding the consensus ceiling value 326, facilitating step 367 of marking an issuer 302 of attribute-based credentials as malicious. In certain embodiments, facilitating step 365 of comparing the size of the accumulator 328 to the consensus ceiling value 326 includes facilitating a method 600 of auditing the identities of credentials hashed in the accumulator. In one or more embodiments, the consensus ceiling value 326 is a per-issuer value. One or more embodiments include facilitating changing the consensus ceiling value 326 by agreement among all participants in the system. In one or more embodiments, the method also includes facilitating a method 500 of revoking all credentials issued by the malicious issuer 302. One or more embodiments include facilitating a method 600 of auditing an identity of a credential 356 by steps that include step 606 of decrypting the credential handle 360 of the credential 356. Certain embodiments include facilitating a second zero-knowledge proof 408 that the accumulator contains a second credential handle 360; and in response to the negative result of the second zero-knowledge proof 408, facilitating step 417 of denying access to the service and step 419 of marking as improperly issued a credential 356 putatively associated with the second credential handle 360. One or more of such embodiments also include facilitating step 421 of marking an issuer 302 of an improperly issued credential 356 as a malicious issuer. One or more embodiments include facilitating a method 500 of revoking all credentials issued by the malicious issuer.

According to other embodiments of the invention, an exemplary computer-implemented method 500 includes facilitating step 502 of revoking a credential by adding a credential handle 360 of the credential 356 to initial revocation information 342; and facilitating step 506 of submitting updated revocation information 342 to the tamperproof log 303. Additionally, one or more embodiments include facilitating step 406 of fetching the revocation information 342 from the tamperproof log 303; and facilitating step 411 of verifying that a second credential was not revoked, by a zero-knowledge proof 408 that does not reveal a credential handle 360 of the second credential 356. For example, step 502 of adding the credential handle 360 to the initial revocation information 342 includes encrypting the credential handle using a revocation authority's public key 340. According to certain embodiments, step 411 of verifying that the second credential was not revoked includes receiving a cyphertext 409, searching the revocation information for the cyphertext 409, and obtaining a negative result of the search.

According to other embodiments of the invention, an exemplary computer-implemented method 600 includes facilitating step 604 of retrieving from a tamperproof log 303 an audit token 605 that contains an encrypted credential handle 360 that is encrypted by an auditor's public key 331 that is published on the tamperproof log 303; and facilitating step 606 of decrypting the credential handle with a private key 332 that corresponds to the auditor's public key 331. One or more embodiments further include facilitating step 607 of writing the audit token 605 to the tamperproof log 303. One or more embodiments also include facilitating step 406 of fetching revocation information 342 from the tamperproof log 303; facilitating step 502 of adding the decrypted credential handle 360 to the revocation information 342; and facilitating step 506 of writing the updated revocation information 342 to the tamperproof log 303. For example, step 502 of adding the decrypted credential handle 360 to the revocation information 342 includes encrypting the decrypted credential handle 360 using a revocation authority's public key 340. One or more embodiments also include facilitating step 416 of providing access to a service in response to a zero-knowledge proof 408 that the revocation information 342 does not contain the credential handle 360. One or more embodiments also include facilitating step 417 of denying access to a service in response to a zero-knowledge proof 408 that the revocation information contains the credential handle.

Figure 11:
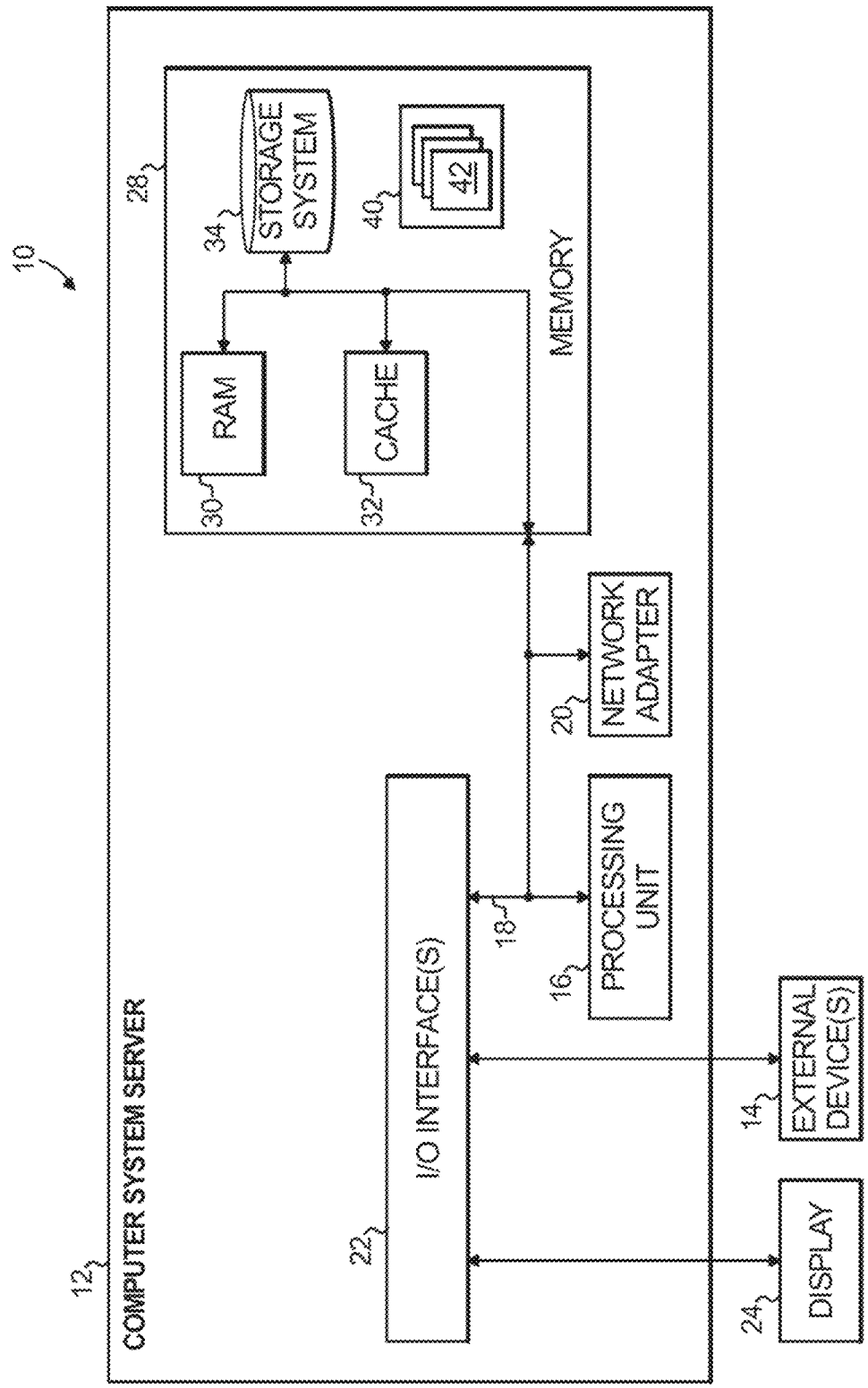
FIG. 11 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 11 depicts a computer system that may be useful in implementing one or more aspects and/or elements of the invention, also representative of a cloud computing node according to an embodiment of the present invention. Referring now to FIG. 11, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 11, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 11) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. For example, the functionality of the tamperproof log 303 can be implemented at each participant by a log software module; the functionality of the user 304 can be implemented by a user software module; the functionality of the service provider 306 can be implemented by a service provider software module; etc. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a privacy-preserving attribute-based credential signed with a private key of an issuer, wherein the credential has a first credential handle as a unique attribute;
   updating an accumulator in a tamperproof log to incorporate the first credential handle; comparing a size of the accumulator to a consensus ceiling value, wherein the size of the accumulator is a total number of credential handles hashed in the accumulator, corresponding respectively to attribute-based credentials issued by the issuer;
   in response to the size of the accumulator exceeding the consensus ceiling value, marking the issuer as malicious and auditing identities of all of the attribute-based credentials with the corresponding credential handles hashed in the accumulator by decrypting the corresponding credential handle of each of the attribute-based credentials using a private key that is shared among a plurality of N auditors, wherein the decryption is performed only upon determining that M of the N auditors are present;
   providing access to a service to a first user associated with the first credential handle, in response to a zero-knowledge proof that the accumulator contains the first credential handle and that a published revocation information does not contain the first credential handle; and
   denying access to the service to a second user associated with a second credential handle in response to a second zero-knowledge proof that the accumulator does not contain the second credential handle.

2. The method of claim 1 wherein the consensus ceiling value is a per-issuer value.

3. The method of claim 1 further comprising:
   changing the consensus ceiling value by agreement among all participants in the system.

4. The method of claim 1 further comprising revoking all credentials issued by the malicious issuer.

5. The method of claim 1 further comprising:
   revoking all credentials issued by the malicious issuer.

6. An apparatus comprising:
   a memory embodying computer executable instructions; and
   at least one processor, coupled to the memory, and operative by the computer executable instructions that cause the apparatus to perform:
      receiving a privacy-preserving attribute-based credential signed with a private key of an issuer, wherein the credential has a first credential handle as a unique attribute;
      updating an accumulator in a tamperproof log to incorporate the first credential handle; comparing a size of the accumulator to a consensus ceiling value, wherein the size of the accumulator is a total number of credential handles hashed in the accumulator, corresponding respectively to attribute-based credentials issued by the issuer;
      in response to the size of the accumulator exceeding the consensus ceiling value, marking the issuer as malicious and auditing identities of all of the attribute-based credentials with the corresponding credential handles hashed in the accumulator by decrypting the corresponding credential handle of each of the attribute-based credentials using a private key that is shared among a plurality of N auditors, wherein the decryption is performed only upon determining that M of the N auditors are present;
      providing access to a service to a first user associated with the first credential handle, in response to a zero-knowledge proof that the accumulator contains the first credential handle and that a published revocation information does not contain the first credential handle; and
      denying access to the service to a second user associated with a second credential handle in response to a second zero-knowledge proof that the accumulator does not contain the second credential handle.

* * * * *